US007540454B2

(12) United States Patent
Gauger

(10) Patent No.: US 7,540,454 B2
(45) Date of Patent: Jun. 2, 2009

(54) DEVICE FOR HOLDING AT LEAST TWO OBLONG ARTICLES

(75) Inventor: Hans Gauger, Hemmingen (DE)

(73) Assignee: A. Raymond & Cie., Grenoble (FR)

( * ) Notice: Subject to any disclaimer, the term of this patent is extended or adjusted under 35 U.S.C. 154(b) by 0 days.

(21) Appl. No.: 10/584,873

(22) PCT Filed: Nov. 11, 2004

(86) PCT No.: PCT/EP2004/012767

§ 371 (c)(1),
(2), (4) Date: Jul. 25, 2007

(87) PCT Pub. No.: WO2005/075870

PCT Pub. Date: Aug. 18, 2005

(65) Prior Publication Data

US 2007/0278356 A1     Dec. 6, 2007

(30) Foreign Application Priority Data

Feb. 4, 2004    (DE) .................. 10 2004 005 432

(51) Int. Cl.
*F16L 3/22*      (2006.01)
(52) U.S. Cl. ................. 248/68.1; 248/73; 248/74.2; 248/74.4
(58) Field of Classification Search ............ 248/65, 248/68.1, 73, 74.2
See application file for complete search history.

(56) References Cited

U.S. PATENT DOCUMENTS

| 2,746,112 | A | | 5/1956 | Simon |
| 3,003,736 | A | * | 10/1961 | Hofgesang ............. 248/229.26 |
| 4,437,633 | A | | 3/1984 | Andre |
| 5,460,342 | A | * | 10/1995 | Dore et al. .................. 248/74.2 |
| 5,461,759 | A | * | 10/1995 | Knoop ........................ 24/555 |

(Continued)

FOREIGN PATENT DOCUMENTS

DE        1962725   A1    11/1971

(Continued)

OTHER PUBLICATIONS

International Search Report EP 2004/012767.

*Primary Examiner*—Amy J. Sterling
(74) *Attorney, Agent, or Firm*—Tarolli, Sundheim, Covell & Tummino, LLP

(57) ABSTRACT

The invention relates to a device for holding at least two oblong articles, comprising a receiving part (4) and spring elements (8, 9, 12, 15, 22, 23) for fixing the articles. A spring element is configured as a movable locking tongue (15) which on its free end is provided with a receiving section (16) and an articulated element (17). While the first article is introduced, the free end is displaced into the deflected position when the articulated element (17) contacts the first article. When the first article comes to rest on an abutment section (20, 21), the receiving section (16) encloses the first articles to such an extent that the locking tongue (15) and, as a result, the articulated element (17) forming an abutment for the second article, is fixed in the rest position. The inventive device allows to hold articles at a relatively large distance to each other and to repeatedly remove them from and reinsert them into the device.

10 Claims, 4 Drawing Sheets

U.S. PATENT DOCUMENTS

Figure 1:
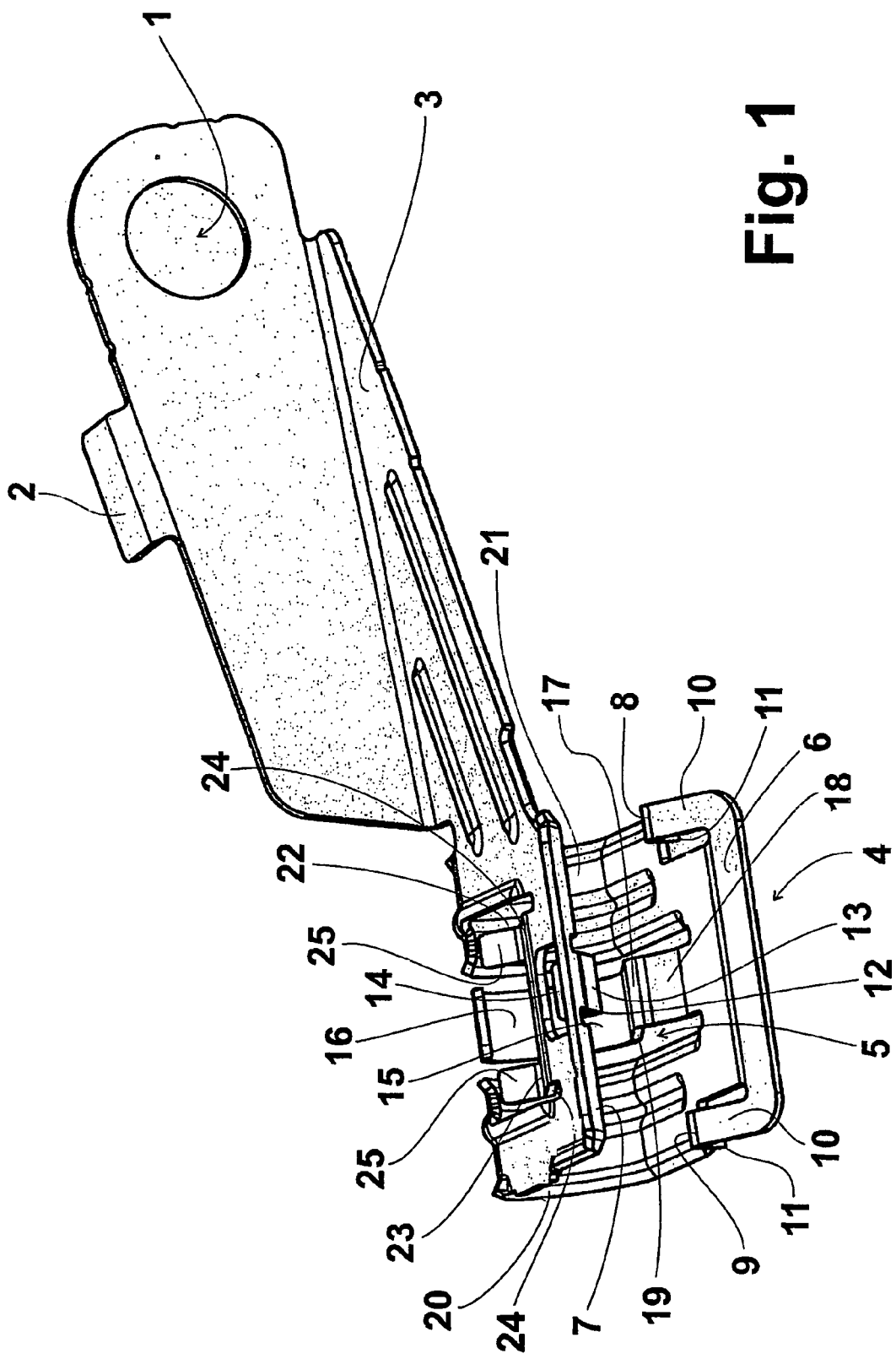

| | | | |
|---|---|---|---|
| 5,645,252 A | 7/1997 | Fisher | |
| 5,947,426 A * | 9/1999 | Kraus | 248/74.2 |
| 5,954,300 A * | 9/1999 | Sturies et al. | 248/68.1 |
| 6,257,530 B1 * | 7/2001 | Tsai | 248/74.2 |
| 6,371,419 B1 * | 4/2002 | Ohnuki | 248/74.2 |
| 6,883,762 B2 * | 4/2005 | Miura et al. | 248/74.2 |
| 6,899,305 B2 * | 5/2005 | Korczak et al. | 248/68.1 |
| 7,152,931 B2 * | 12/2006 | Suzuki et al. | 303/87 |
| 2005/0121561 A1 * | 6/2005 | Sweigard | 248/74.2 |

FOREIGN PATENT DOCUMENTS

| | | |
|---|---|---|
| DE | 3042309 A1 | 5/1982 |
| FR | 1597332 A | 9/1970 |
| GB | 2092216 A | 8/1982 |

\* cited by examiner

DEVICE FOR HOLDING AT LEAST TWO OBLONG ARTICLES

The invention relates to a device for holding at least two oblong articles in an essentially parallel arrangement, with a receiving part for receiving the articles, which encloses a receiving space, whereby the receiving part exhibits an abutment section on which the first article introduced into the receiving part rests, and with spring elements which are connected with the receiving part and which are for fixing the articles.

Such a device is known from DE 30 42 309 A1. The previously known device has a receiving part which encloses a receiving space and into which oblong articles, e.g., pipelines or cable lines, can be introduced in an introduction direction. Elastic holding tongues, which are directed into the middle section of the receiving space and are to run towards each other in the introduction direction of the articles, are placed on side walls of the receiving part. The ends of holding tongues that are arranged between two articles hold the particular articles at a distance from each other, and the ends of the holding tongues that terminate the receiving space come to rest on the last article introduced. With this device, articles are indeed held from each other at a distance that approximately corresponds to the thickness of the holding tongues, but because of the elasticity of the holding tongues and the relatively close arrangement to each other, there is a danger that the articles will be displaced towards each other and will touch each other in the event of, for example, severe shaking. However, this is disadvantageous in the case of relatively sensitive articles. A further disadvantage consists in the fact that the articles either cannot be removed from the device at all, or can be removed only by destroying or at least damaging the holding tongues.

The invention is based on the problem of creating a device of the type mentioned at the beginning, which is characterized by especially stable holding of oblong articles that are relatively thick in cross section at a relatively large distance from each other, and in which the articles can be easily removed from the receiving part despite the stable fixing.

In a device of the type mentioned at the beginning, this problem is solved inventively in that a spring element is configured as a locking tongue which can be moved transversely to the longitudinal direction of the receiving part between a deflected position and a rest position, and which is configured at its free end with a receiving section for the first article, and in the introduction direction upstream of the receiving section, is configured with an articulated element that protrudes into the receiving space when in the rest position, whereby when the first article is introduced, the free end is displaced into the deflected position when the articulated element contacts the first article, and when the first article comes to rest on the abutment section, the receiving section encloses the first article to such an extent that the locking tongue is fixed in the rest position.

Through the fact that on the inventive device a spring element is configured as a movable locking tongue which exhibits an articulated element and which can be fixed in the rest position by the first article that is introduced, the articulated element that protrudes into the receiving space also lies in fixed fashion. As a result, the articulated element forms a fixed abutment for a second article, in particular, even at a relatively large distance, e.g., half the diameter of an introduced article, in front of the first article, which has already been introduced. Thus, the articles are held in a very stable fashion, even at a relatively large distance from each other. In addition, following removal of the second article from the receiving part, the first article can also easily be removed following the release of the articulated element, so that the procedure of introducing and removing articles can be repeated as often as desired without impairing the functionality.

Practical embodiments of the invention are the object of the subclaims.

Figure 2:
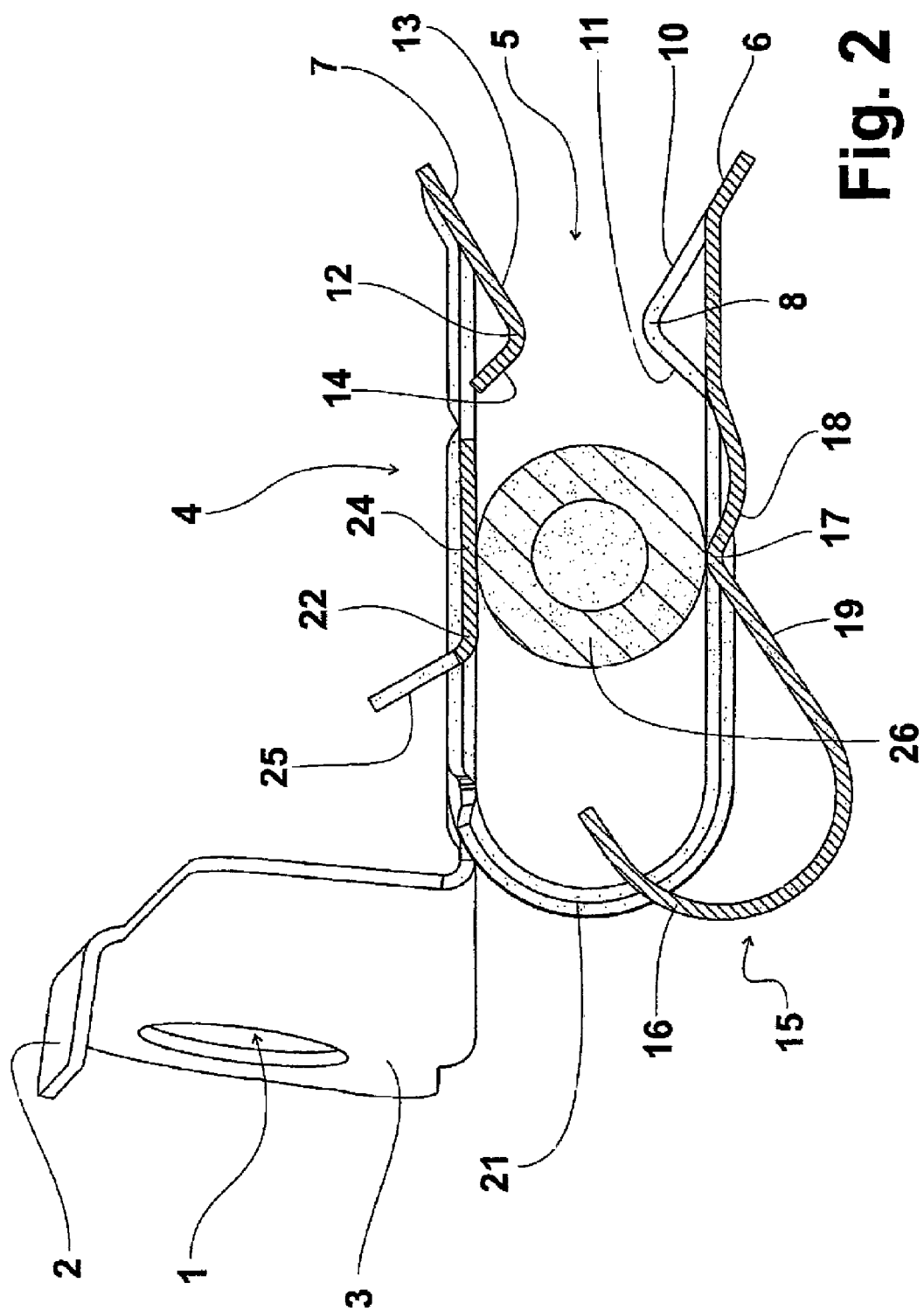
Figure 3:
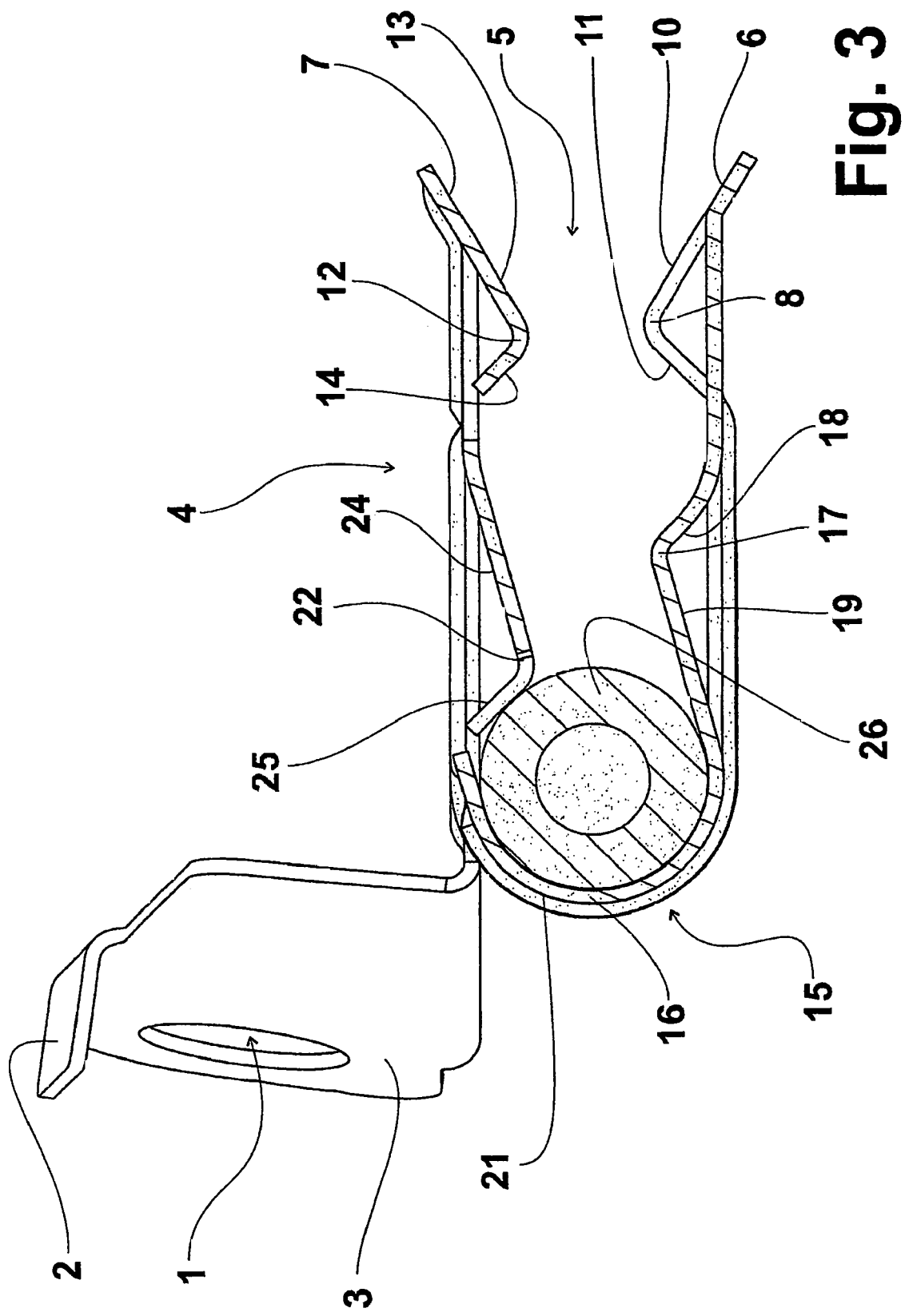
Figure 4:
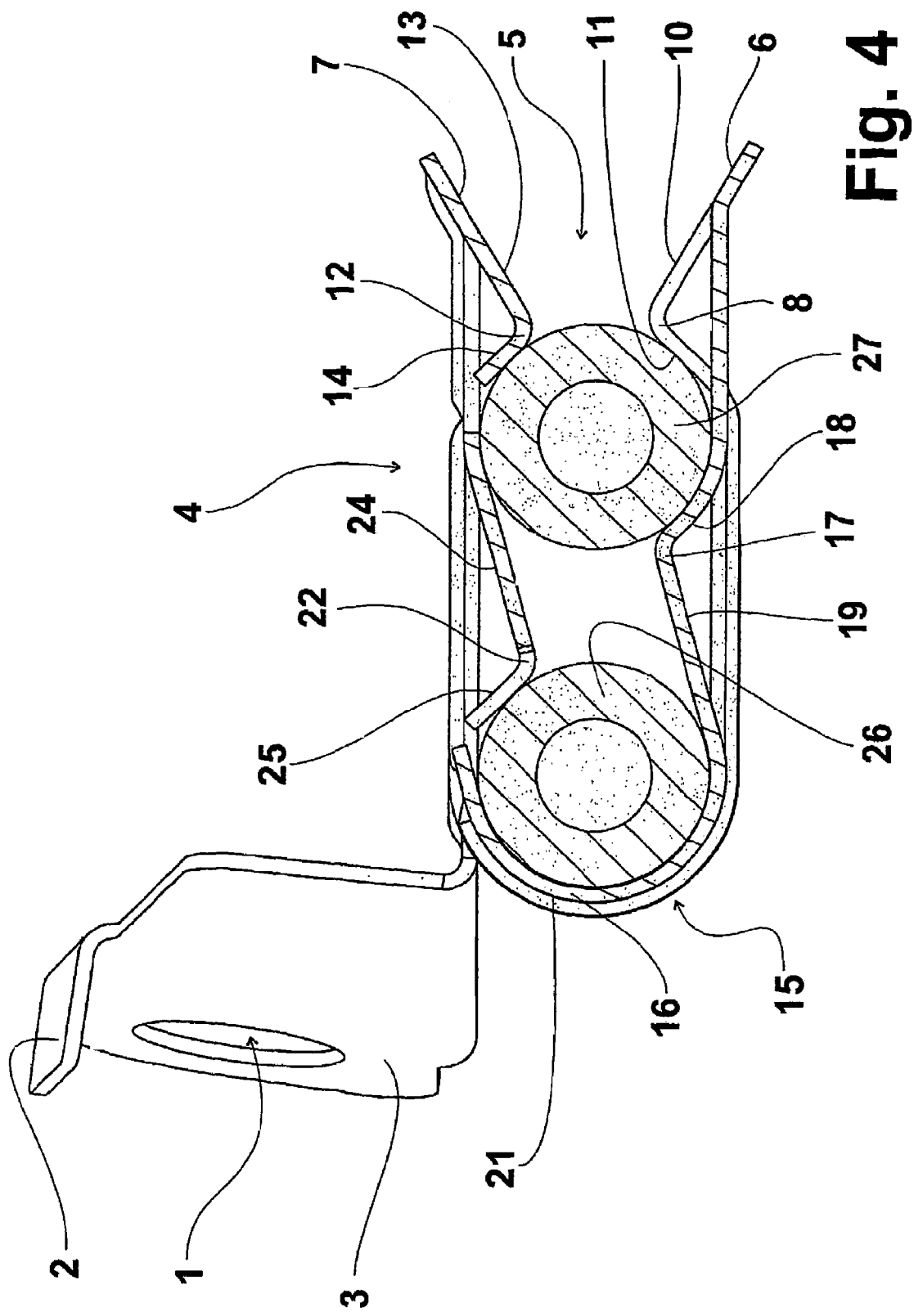

Additional practical configurations of the invention arise from the following description of an embodiment, with references to the figures of the drawing. The following are shown:

FIG. 1, a perspective view of an embodiment of an inventive device,

FIG. 2, a cross section of the embodiment per FIG. 1 during introduction of a first article, which is located in the area of an articulated element of a locking tongue, FIG. 3, a cross section of the embodiment per FIG. 1 and FIG. 2 with the first article resting on an abutment section with fixed locking tongue, and FIG. 4, a cross section of the embodiment per FIGS. 1 through 3 with a second article resting on the articulated element.

FIG. 1 shows a perspective view of an embodiment of an inventive device made from a punched and bent metal sheet, in which are present a fastening part 3, which is bent and is configured with a fastening hole 1 and a fastening tongue 2 for fastening to a carrier part, not shown in FIG. 1, and an oblong receiving part 4 for receiving two oblong articles, not shown in FIG. 1, e.g., lines with a relatively sensitive sheathing such as metal foil. The receiving part 4 exhibits an essentially U-shaped form and encloses a receiving space 5. One leg of the receiving part 4 is connected with the fastening part 3.

Configured on the free ends of the leg of the receiving part 4 are a first introduction web 6 and a second introduction web 7, which lie opposite each other, run in the longitudinal direction and are bent outward. Configured as spring elements on the outside edge areas of the first introduction web 6 are a first edge tongue 8 and a second edge tongue 9, which project into the receiving space 5 with a slide-on section 10 that rises in the introduction direction and an abutment section 11 that falls in the introduction direction.

Present as an additional spring element on the second introduction web 7, which is configured in the middle section of the leg that is connected with the fastening part 3, is a middle tongue 12, which is also configured with a slide-on section 13 that rises in the introduction direction and an abutment section 14 that falls in the introduction direction, which project into the receiving space 5.

Present as a spring element in the middle behind the first introduction web 6 in the introduction direction is a locking tongue 15 which is movable between a rest position shown in FIG. 1 and a deflected position, and which is configured on its free end with a receiving section 16, which is bent round and which in the introduction direction is upstream of the receiving section 16 and is configured with an articulated element 17 which protrudes into the receiving space 5 when in the rest position. In the embodiment shown, the articulated element 17 is configured with a front section 18 that rises in the introduction direction and a back section 19 that falls in the introduction direction, which come together in a break region and form there the most raised region of the articulated element 17. When the locking tongue 15 is in the rest position, the receiving section 16 is arranged aligned with the essentially semicircular edging strips 20, 21, which connect the legs of the receiving part 4 and form an abutment section.

Finally, provided as additional spring elements on both sides on the leg of the receiving part 4 that is connected with the fastening part 3 in an extension of the middle tongue 12 are a first counter-tongue 22 and a second counter-tongue 23, both of which exhibit a front section 24 that rises in the introduction direction and a back section 25 that falls in the introduction direction. The front sections 24 and the back sections 25 of the counter tongues 22, 23 each come together in break regions which lie opposite the most raised region of the articulated element 17.

FIG. 2 shows a cross section of the embodiment per FIG. 1 during introduction of an oblong first article 26, which has been introduced via the open side of the receiving part 4 and which now is located in the area of the most raised region of the articulated element 17 that is present on the locking tongue 15. It can be seen from FIG. 2 that in this arrangement of the first article 26 the movable locking tongue 15 is in a deflected position at maximum deflection.

FIG. 3 shows a cross section of the embodiment per FIG. 1 and FIG. 2, with the first article 26 resting on the edging strips 20, 21 that form the abutment section. In this arrangement of the first article 26, the locking tongue 15 is in the rest position again, whereby the receiving section 16 of the locking tongue 15 encloses the first article 26, which is immobilized by the fixing action of the edging strips 20, 21 resulting from the positive fit, so that the locking tongue 15 is also fixed. In addition to the holding effect of the articulated element 17 back section 19, which rises in the introduction direction, the back sections 25 of the counter-tongues 22, 23 rest on the first article 26.

FIG. 4 shows a cross section of the embodiment per FIG. 1 through FIG. 3, with a second article 27 resting on the articulated element 17 front section 18, which rises in the introduction direction. As a result of the fixing of the locking tongue 15, the articulated element 17 forms for the second article 27 an obstacle that is nearly insurmountable even with the greatest input of force, so that the second article 27 is held, together with the fixing effect of the edge tongues 8, 9, in the receiving part 4 at a distance from the first article 26 that corresponds to that of the position of the articulated element 17.

It can also be seen from FIG. 4 that when overcoming the opposing resistance from the edge tongues 8, 9 following removal of the second article 27, the first article 26 can also be removed from the receiving part 4 by a movement opposite to the introduction direction after overcoming the opposing resistance from the articulated element 17, without damage or even destruction of the receiving part 4. The operation of inserting and removing articles 26, 27 can thus be repeated as often as desired, without the holding effect being impaired or the articles 26, 27 being damaged.

The invention claimed is:

1. A device for holding at least two oblong articles in an essentially parallel arrangement, the device comprising:
    a receiving part having an open side for the introduction of the articles and a closed side which encloses a receiving space for receiving the articles, the receiving part having an abutment section on which the first article introduced into the receiving part engages;
    spring elements connected with the receiving part for fixing the articles in the receiving space, one of the spring elements being configured as a locking tongue moveable transversely to the longitudinal direction of the receiving part between a rest position and a deflected position, the locking tongue comprising
        a free end having a bent receiving section for receiving the first article, the bent receiving section being aligned with the abutment section when the locking tongue is in the rest position; and
        an articulating element between the receiving section and the open side of the receiving part, the articulating element protruding into the receiving space when the locking tongue is in the rest position;
    wherein introduction of the first article into the receiving portion displaces the free end of the locking tongue into the deflected position when the articulating element contacts the first article;
    wherein further introduction of the article into the receiving portion causes the first article to rest on the abutment section, the receiving section engaging the first article such that the locking tongue returns to, and becomes locked in, the rest position, the articulating element being arranged between two areas of the receiving space that each receive one of the articles.

2. Device according to claim 1 wherein the side of the receiving section facing the first article is configured in accordance with the abutment section.

3. Device according to claim 1 wherein the articulating element exhibits a front section and a back section that come together in a break region that projects into the receiving space.

4. Device according to claim 1 further comprising at least one additional spring element that lies opposite the articulating element.

5. Device according to claim 4, wherein each spring element that lies opposite the articulating element is configured as a counter-tongue with a projection that lies opposite the most raised region of the articulating element.

6. Device according to claim 5 wherein each projection is formed by a front section and a back section which come together in a break region that projects into the receiving space.

7. Device according to claim 2 wherein the articulating element exhibits a front section and a back section that come together in a break region that projects into the receiving space.

8. Device according to claim 2 further comprising at least one additional spring element that lies opposite the articulating element.

9. Device according to claim 3 further comprising at least one additional spring element that lies opposite the articulating element.

10. Device according to claim 1 wherein the articulating element, when locked in the rest position, prevents the second article from contacting the first article.

* * * * *